United States Patent [19]

Murakami

[11] Patent Number: 4,978,157
[45] Date of Patent: Dec. 18, 1990

[54] REAR SEAT BACK MOUNTING STRUCTURE FOR AUTOMOTIVE VEHICLE

[75] Inventor: Takashi Murakami, Ebina, Japan

[73] Assignee: Nissan Motor Co., Ltd., Yokohama, Japan

[21] Appl. No.: 351,113

[22] Filed: May 12, 1989

[30] Foreign Application Priority Data

May 13, 1988 [JP] Japan .............................. 63-63097[U]

[51] Int. Cl.$^5$ .............................................. B60N 2/22
[52] U.S. Cl. ....................................... 296/63; 297/379
[58] Field of Search ................... 296/63, 65.1; 297/379

[56] References Cited

U.S. PATENT DOCUMENTS

| | | | |
|---|---|---|---|
| 1,812,067 | 6/1931 | Toncray | 296/65.1 |
| 4,708,385 | 11/1987 | Konou | 296/65.1 |
| 4,822,092 | 4/1989 | Sweers | 296/63 |

FOREIGN PATENT DOCUMENTS 56-69542  6/1981  Japan .

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

To prevent a rear seat back from being removed from a rear parcel shelf from the passenger compartment side but allow it to be removed therefrom only when the trunk room is opened (the above function is effective to prevent baggages placed.in the trunk room from being stolen from the passenger compartment side), a rear seat back monitoring structure comprises a U-shaped wire attached to the upper reverse surface of the rear seat back and inserted into a trunk room through a hole formed in the rear parcel shelf; and a wire engage member engageable with an end of the U-shaped wire from the trunk room side and formed with a portion whose dimension is larger than a diameter of the hole.

8 Claims, 5 Drawing Sheets

FRONT

TOP

BOTTOM

SIDE

REAR SEAT BACK MOUNTING STRUCTURE FOR AUTOMOTIVE VEHICLE

BACKGROUND OF THE INVENTION

1. Field of the Invention

The present invention relates to a rear seat back mounting structure for an automotive vehicle.

2. Description of the Prior Art

FIG. 1 shows an example of a prior-art seat back mounting structure for an automotive vehicle, which is disclosed in Japanese Published Unexamined (Kokai) Utility Model Appli. No. 56-69542. In this prior-art structure, a seat back 1 is mounted on a rear parcel shelf 3 of a vehicle body 6 by inserting a plurality of U-shaped wires 2A attached to the upper reverse side of the seat back 1 into a plurality of holes 4A formed in the rear parcel shelf 3. Further, similar U-shaped wires 2B attached to the lower side end of the seat back 1 are inserted into holes 4B formed in a tire house 6a and a floor panel 6b of the vehicle body 6 and fixed to the vehicle body 6 with screws 7. Further, in some cases, the seat back 1 is mounted on the rear parcel shelf 3 by inserting the U-shaped wires 2A via resin hooks fitted to the holes 4A, respectively.

On the other hand, a seat cushion 8 is fixed to the floor panel 6b by engaging a plurality of similar U-shaped wires 2C attached to the front reverse side of the seat cushion 8 into a plurality of hooks 11 attached to the floor panel 6b. Further, similar U-shaped wires 2D attached to the rear side end of the seat cushion 8 are fixed to the floor panel 6b with screws 13.

In the above-mentioned prior-art seat back mounting structure, however, there exists a problem in that the seat back 1 is easily removed from the rear parcel shelf 3 in the case where the U-shaped wires 2A are simply inserted into the holes 4A. Further, in the case where resin hooks are fitted to the holes 4A of the rear parcel shelf 3, there exist other problems in that it is difficult to remove the rear seat back 1 from the rear parcel shelf 3 and therefore the rear seat back 1 is easily deformed because the locking intensity of the resin hook is subjected to the influence of temperature.

In this connection, when an opening 6d is formed in a rear seat back brace 6c according to models of passenger cars, since a trunk room 12 is open toward the passenger compartment side after the seat back 1 has been removed, there exists another problem in that baggages placed in the trunk room 12 are easily stolen from the passenger compartment side.

SUMMARY OF THE INVENTION

With these problems in mind, therefore, it is the primary object of the present invention to provide a seat back mounting structure for an automotive vehicle which is difficult to be removed from the rear parcel shelf on the passenger compartment side but easy to be removed therefrom only when the trunk room is opened.

To achieve the above-mentioned object, the rear seat back mounting structure for an automotive vehicle, according to the present invention, for mounting a rear seat back in a rear parcel shelf for partitioning a trunk room from a passenger compartment comprises: (a) a U-shaped wire attached to an upper reverse surface of the rear seat back and inserted into a trunk room through a hole formed in the rear parcel shelf; and (b) a wire engage member engageable with an end of said U-shaped wire from the trunk room side, said wire engage member being formed with a portion whose dimension is larger than a diameter of the hole formed in the rear parcel shelf for prevention of removal of the rear seat back from the passenger compartment side but for allowing removal of the same rear seat back from the same side only after said wire engage member has been disengaged from the U-shaped wire on the trunk room side.

The wire engage member comprises: (a) a base portion formed with bottom wire engage portion engageable with a horizontal portion of said U-shaped wire; (b) a top portion formed on top of said base portion whose dimension is larger than a diameter of the hole formed in the rear parcel shelf; and (c) a pair of wing portions extending from both side surfaces of said base portion and engageable with two vertical portions of said U-shaped wire.

Further, it is preferable that the wing portion of the wire engage member is formed with a knob portion for providing an easy removal of the U-shaped wire from the wire engage member and with a guide portion for guiding the vertical portion of the wire into engagement with the wing portion. Further, it is preferable that the top portion of the wire engage member is further formed with a slop portion for pivoting the wire engage member in a direction that the wire engage member is further engaged with the wire when the slop portion is urged against an edge of the hole into which the wire is inserted.

In the structure according to the present invention, since the U-shaped wires attached to the upper reverse surface of the seat back are inserted into the holes formed in the rear parcel shelf of the vehicle body from the passenger compartment side, and further the wire engage members are engaged with the wire from the trunk room side, it is possible to prevent the rear seat back from being removed from the passenger compartment side but to allow it from being removed from the same side only after the wire engage members have been removed from the wires from the trunk room side.

DETAILED DESCRIPTION OF THE PREFERRED EMBODIMENT

Figure 1:
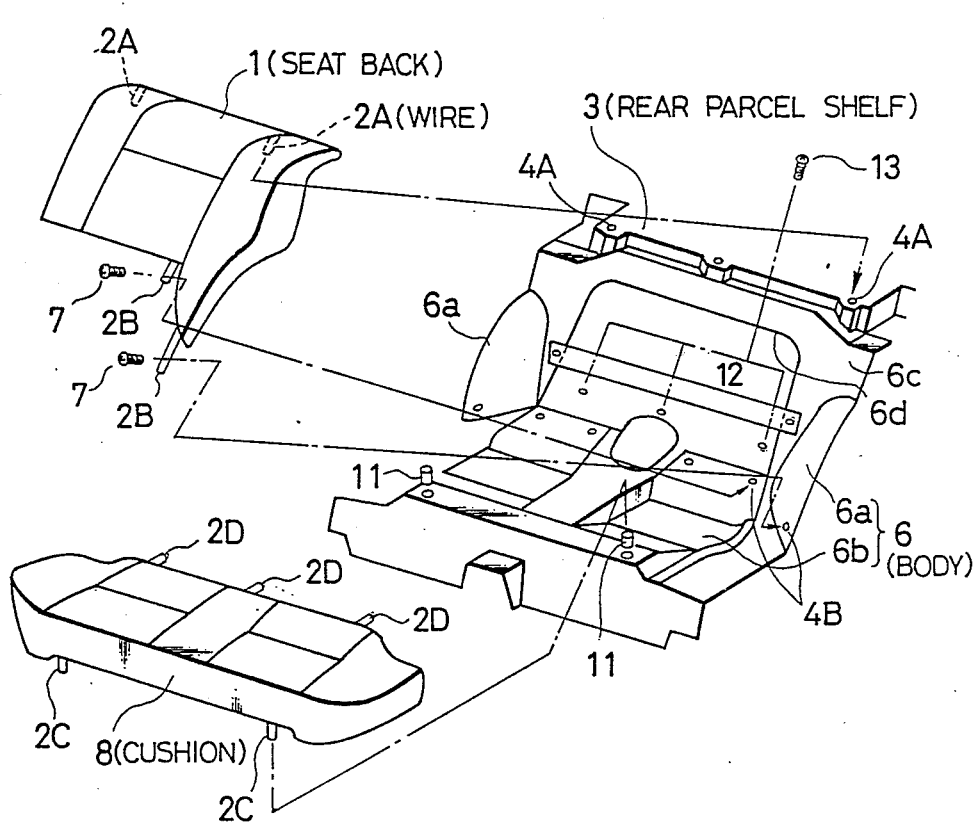
FIG. 1 is a perspective view for assistance in explaining an example of a prior-art seat back mounting structure for an automotive vehicle.
Figure 2:
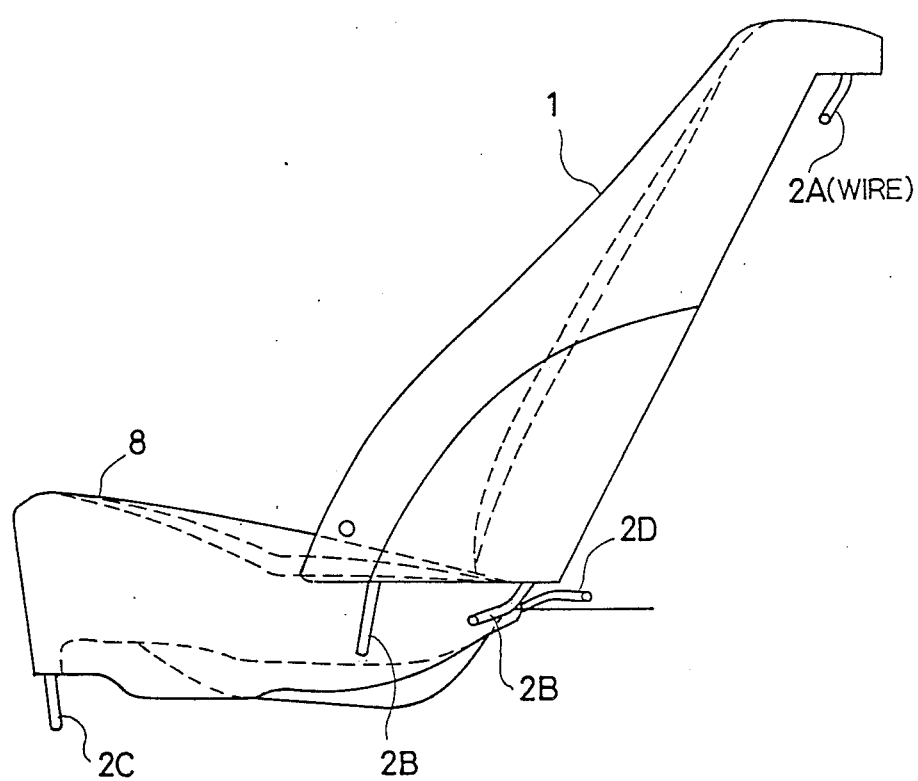
FIG. 2 is a side view showing a rear seat.

FIG. 2 is a side view showing a rear seat for an automotive vehicle, which is roughly composed of a seat back 1 and a seat cushion 8. A plurality of U-shaped wires 2A are attached to the upper reverse surface of the seat back 1; a plurality of similar U-shaped wires 2B are attached to the lower side end of the seat back 1; a plurality of U-shaped wires 2C are attached to the front reverse surface of the seat cushion 8; and a plurality of similar U-shaped wires 2D are attached to the rear side end of the seat cushion 8 all in the same way as in the conventional rear seat.

Figure 3:
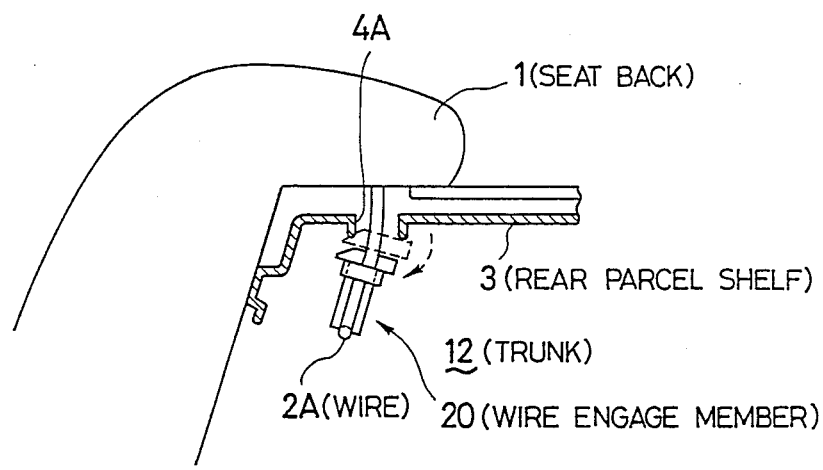
FIG. 3 is an enlarged side view showing an embodiment of the seat back mounting structure according to the present invention.

The gist of the present invention is to provide a structure of mounting the U-shaped wires 2A attached to the upper reverse surface of the seat back on a rear parcel shelf 3 of a vehicle body 6, as shown in FIG. 3, in which the wires 2A are inserted into holes 4A formed in a rear parcel shelf 3 and further engaged with a wire engage member 20 in a trunk room 12.

Figure 4:
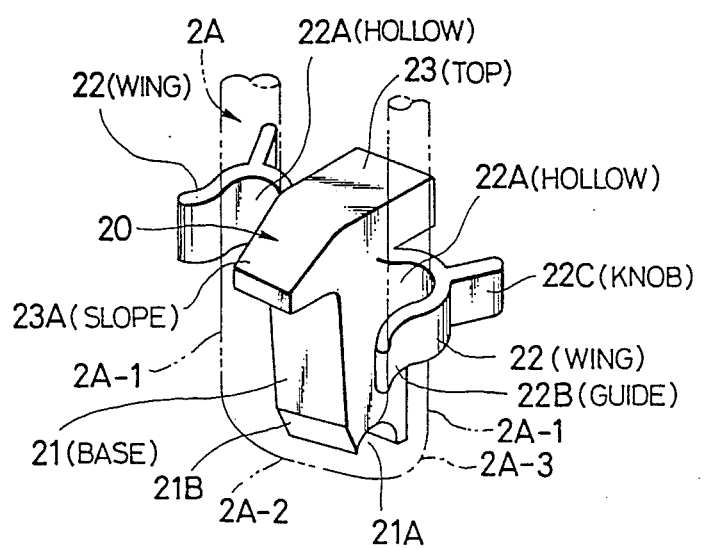
FIG. 4 is a perspective view showing an embodiment of a wire engage member according to the present invention.
Figure 5:
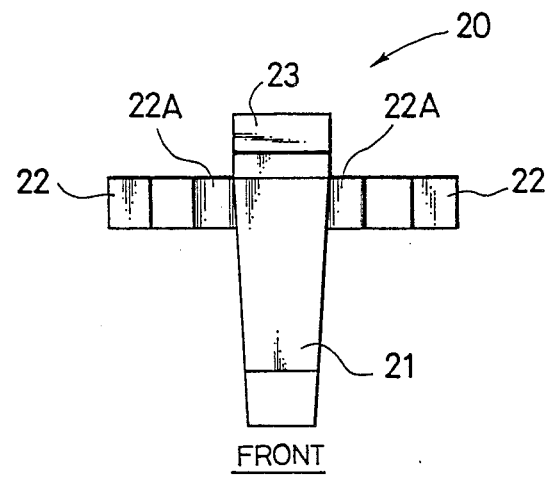
FIG. 5 is a front view of the wire engage member shown in FIG. 4.
Figure 6:
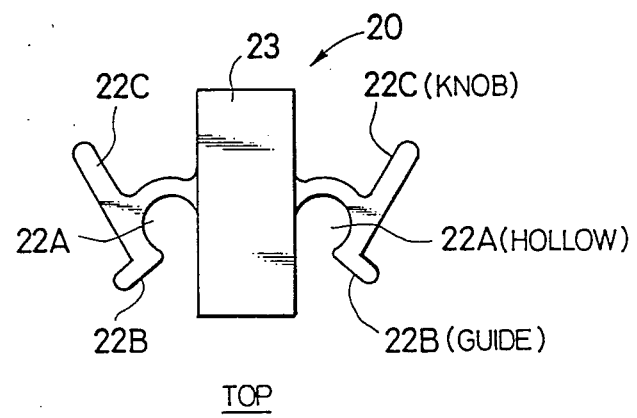
FIG. 6 is a top view of the wire engage member.
Figure 7:
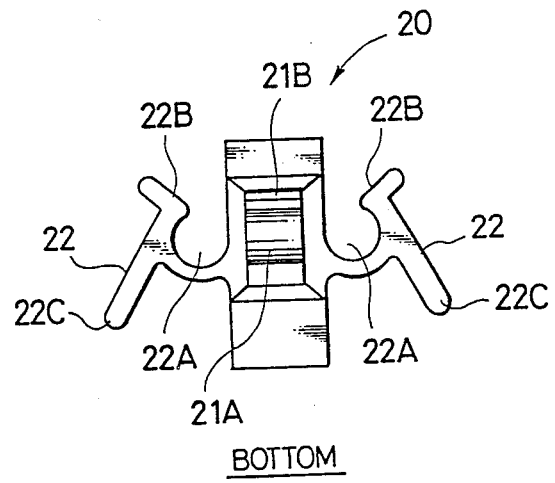
FIG. 7 is a bottom view of the wire engage member.
Figure 8:
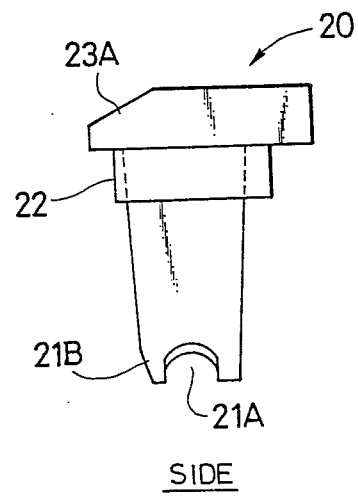
FIG. 8 is a side view of the wire engage member.

FIG. 4 shows the engagement relationship between the U-shaped wire 2A and the wire engage member 20. The U-shaped wire 2A is formed with two vertical portions 2A-1, a horizontal portion 2A-2, and two corner portions 2A-3 between the vertical and horizontal portions 2A-1 and 2A-2. The wire engage member 20 is formed with a square-shaped base portion 21, two roughly semicircular wire engage wing portions 22 extending from the side surfaces of the square base portion 21, and a wedge-shaped solid top portion 23 extending from the square-shaped base portion 21 at right angles with respect to the base portion 21 and the wing portion 22 so as to form a double T-shaped wire engage member 20. Each wire engage wing portion 22 is formed with a semicylindrical side hollow portion 22A engaged with the vertical portion 2A-1 of the U-shaped wire 2A. Further, the wire engage wing portion 22 is formed with an outwardly widened guide portion 22B for providing an easy insertion of the wire 2A into the semicylindrical hollow portion 22A, and a rearward extending knob portion 22C for providing an easy removal of the wire 2A from the semicylindrical hollow portion 22A. Further, the square-shaped base portion 21 is formed with an semicylindrical bottom hollow portion 21A engaged with the horizontal portion 2A-2 of the U-shaped wire 2A and a slope surface portion 21B at the lower end thereof. Further, the wedge-shaped top portion 23 is formed with a slope surface portion 23A.

Therefore, when the semicylindrical bottom hollow portion 21A of the base portion 21 is first engaged with the horizontal portion 2A-2 of the wire 2A, and thereafter the wire engage member 20 is pivoted counterclockwise in FIGS. 3 and 4 until the two hollow portions 22A of the wire engage wing portion 22 are engaged with the two vertical portions 2A-1 of the U-shaped wire 2A through the guide portions 22B. Further, it is also possible to engage the wire engage member 20 with the U-shaped wire 2A by first engaging the two hollow portions 22A of the wire engage wing portion 22 and thereafter by moving the engage member 20 in the downward direction until the bottom hollow portion 21A is engaged with the horizontal portion 2A-2 of the wire 2A.

On the other hand, to remove the wire engage member 20 from the wire 2A, the two knob portions 22C are pinched by the fingers. Since the wire engage wing portions 22 are elastically deformed, the wing portions 22 are removed from the vertical portions 2A-1 of the U-shaped wire 2A. Thereafter, the wire engage member 20 is pivoted clockwise in FIGS. 3 and 4 to remove the wire engage member 20 from the horizontal portion 2A-2 of the U-shaped wire 2A with the bottom hollow portion 21B as its pivotal center.

Further, it is also possible to remove the wire engage member 20 from the U-shaped wire 2A by first sliding the engage member 20 upward and then by pinching the two knob portions 22C of the wire engage member 20.

In dimensions, the vertical length of the square-shaped base portion 21 is about 33 mm. The radius of the semicircular bottom hollow portion 21A of the square-shaped base portion 21 is about 2.75 mm which is a little larger than a half of the wire diameter 5 mm, for instance. Further, the thickness of the wedge-shaped top portion 23 is about 3.5 mm and the length of the slope surface portion 23A thereof is about 7 mm.

The complicated shape of the wire engage member 20 will be further understood with reference to the front, top, bottom and side views thereof shown in FIGS. 5, 6, 7 and 8.

In mounting the rear seat back 1 on the rear parcel shelf 3, the U-shaped wires 2A are first inserted into the holes 4A formed in the rear parcel shelf 3 from the passenger compartment side. Thereafter, the wire engage member 20 is engaged with the U-shaped wire 2A from the trunk room side.

Under these conditions, when the rear seat back 1 is moved upward from the passenger compartment side, since the top portions 23 of the wire engage members 20 are brought into contact with the lower inner surface of the rear parcel shelf 3, the seat back 1 will not be removed, because the horizontal portion 2A-2 of the wire 2A is more firmly engaged with the semicylindrical bottom hollow portion 21A of the wire engage member 20. Further, since the slope portion 23A is formed in the wedge-shaped top portion 23, when the wire engage member 20 is pulled upward and therefore the slope portion 23A is brought into contact with an edge portion of the hole 4A, the wire engage member 20 is pivoted in clockwise direction with the flat surface of the top portion 23 in contact with the rear edge of the hole 4A and with the slope portion 23A thereof in contact with the front edge of the hole 4A as shown by dashed lines in FIG. 3. Therefore, the semicylindrical hollow portion 22A of the wire engage wing portions 22 are further firmly engaged with the vertical portions 2A-1 of the U-shaped wire 2A.

Further, when the rear seat back 1 is required to remove, the two knob portions 22C of the wire engage wing portions 22 are pinched by the fingers of a repairman from the trunk room side, since the semicylindrical side hollow portions 22A are disengaged from the wire vertical portions 2A-1 of the wire 2A, it is possible to easily remove the wire engage member 20 from the U-shaped wire 2A by pivoting the wire engage member 20 clockwise with the bottom hollow portion 21A of the base portion 21 as its center.

As described above, in the rear seat back mounting structure for an automotive vehicle according to the present invention, since the U-shaped wires attached to the upper reverse surface of the seat back are inserted into the holes formed in the rear parcel shelf of the vehicle body from the passenger compartment side, and further the wire engage members are engaged with the wire from the trunk room side, it is possible to prevent the rear seat back from being removed from the passenger compartment side but to allow it from being removed from the same side only after the wire engage members have been removed from the wires from the trunk room side. Therefore, if an opening is formed in a rear seat back brace, it is possible to prevent baggages placed in the trunk room from being stolen from the passenger compartment side after the rear seat back has been removed from the vehicle body from the passenger compartment side.

What is claimed is:

1. A rear seat back mounting structure for an automotive vehicle, for mounting a rear seat back on a rear parcel shelf for partitioning a trunk room from a passenger compartment, comprising:
   (a) a U-shaped wire attached to an upper reverse surface of the rear seat back and inserted into the trunk room through a hole formed in the rear parcel shelf; and
   (b) a selectively engageable wire engaging member selectively engageable and disengageable with an end of said U-shaped wire only from the trunk room, said wire engaging member comprising a solid portion suspended below said shelf by said wire and having a dimension larger than a diameter of the hole formed in the rear parcel shelf for precluding passage of said engaging member through the hole when said wire engaging member is engaged.

2. The rear seat back mounting structure of claim 1, wherein said wire engaging member comprises:
   (a) a base portion formed with a bottom wire engaging portion engageable with a horizontal portion of said U-shaped wire and a pair of outer side surfaces;
   (b) a solid top portion formed on top of said base portion whose dimension is larger than a diameter of the hole formed in the rear parcel shelf; and
   (c) a pair of wing portions, one extending from each outer side surface of said base portion, said wing portions each being engageable with one vertical portion of said U-shaped wire, respectively.

3. The rear seat back mounting structure of claim 2, wherein said wing portion further comprises a knob portion means for providing an easy removal of said wire engage member from said U-shaped wire.

4. The rear seat back mounting structure of claim 2, wherein said wing portion further comprises a guide portion means for guiding the vertical portion of said wire into engagement with said wing portion.

5. The rear seat back mounting structure of claim 2, wherein said solid top portion further comprises a sloped portion means extending downward toward an open side of said wing portion toward said wire, for pivoting said wire engaging member in a direction that said wire engagement member is further engaged with the wire when said sloped portion means of said top portion is urged against an edge of the hole formed in the rear parcel shelf.

6. The rear seat structure of claim 1, wherein said wire engaging member comprises a base portion, and said solid portion being a solid top portion extending from a top side to said base portion at a generally right angle and being larger than a diameter of said hole formed in said rear parcel shelf, wherein said base portion and said top portion can be accommodated between two vertical portions and a horizontal portion of said U-shaped wire.

7. The rear seat structure of claim 6, wherein said wire engaging member comprises two wing portions, each wing portion extending from an opposite outer side of said base portion and being engageable with one of said vertical portions of said U-shaped wire.

8. The rear seat structure of claim 7, wherein said base portion includes a bottom comprising a hollow semi-circular portion engageable with said horizontal portion of said U-shaped wire; and each of said wing portions comprises a hollow semi-circular potion engageable with one of said vertical portions of said U-shaped wire.

* * * * *